United States Patent

Khanna et al.

Patent Number: 5,999,819
Date of Patent: Dec. 7, 1999

[54] WIRELESS TELECOMMUNICATIONS SYSTEM AND METHOD FOR DESIGNING SAME

[75] Inventors: Sanjeev Khanna, Highland Park; Krishnan Kumaran, Scotch Plains, both of N.J.

[73] Assignee: Lucent Technologies, Inc., Murray Hill, N.J.

[21] Appl. No.: 09/048,384

[22] Filed: Mar. 26, 1998

[51] Int. Cl.[6] .................................................. H04Q 7/00
[52] U.S. Cl. .......................... 455/450; 455/509; 455/63
[58] Field of Search .................................. 455/422, 446, 455/447, 450, 452, 453, 455, 501, 509–510, 512–513, 516, 62–63, 67.1, 67.3; 370/329

[56] References Cited

U.S. PATENT DOCUMENTS

| 5,404,574 | 4/1995 | Benveniste | 455/453 |
| 5,740,536 | 4/1998 | Benveniste | 455/63 |
| 5,778,317 | 7/1998 | Kaminsky | 455/450 |
| 5,903,842 | 5/1999 | Wang et al. | 455/450 |

Primary Examiner—Doris H. To

[57] ABSTRACT

A method for designing a wireless telecommunications system having a plurality of cells is provided. In one embodiment of such a method, a call demand per cell is estimated, and a channel demand based thereon is determined on a cell-by-cell basis. The cell-by-cell channel demand is used to provide a reasonably tight upper bound on the number of communication channels required to satisfy the system-wide call demand. It is implicit in the procedure for estimating the upper bound that no mutually "interfering" base stations use the same channel (i.e., frequency). "Cliques" of mutually-interfering base stations or cells are defined. A channel demand is determined for each clique by adding up the channel demand for each cell in the clique. The greatest channel demand of all cliques determines a "maximum clique demand" $\omega^d$. The upper bound on the number of channels required to satisfy the system-wide call demand is given by the expression: $\chi^d \leq 17/12 \cdot \omega^d$ when mutually-interfering cells are adjacent cells, and is given by the expression: $\chi^d \leq 2 \cdot \omega^d - d_{min}$ when mutually interfering cells are adjacent cells and next-to-adjacent cells, wherein $d_{min}$ is a minimum channel demand of all cells in the system. Having a reasonably-good estimate of the upper bound on the system-wide channel requirement, a wireless service provider may then seek to obtain or allot a commensurate amount of frequency spectrum to support its system.

7 Claims, 3 Drawing Sheets

100

WIRELESS TELECOMMUNICATIONS SYSTEM AND METHOD FOR DESIGNING SAME

FIELD OF THE INVENTION

The present invention relates generally to telecommunications. More particularly, the present invention relates to a method for designing a wireless telecommunications system wherein frequency spectrum requirements are estimated.

BACKGROUND OF THE INVENTION

FIG. 1 depicts a schematic diagram of a portion of a typical wireless telecommunications system in the prior art. Such a system provides wireless telecommunications service to a number of wireless terminals (e.g., wireless terminals 101-1 through 103-1) that are situated within a geographic region.

The heart of a typical wireless telecommunications system is Wireless Switching Center ("WSC")120, which may also be known as a Mobile Switching Center ("MSC") or a Mobile Telephone Switching Office ("MTSO"). Typically, WSC 120 is connected to a plurality of base stations (e.g., base stations 103-1 through 103-5) that are dispersed throughout the geographic area serviced by the system. Additionally, WSC 120 is connected to local- and toll-offices (e.g., local-office 130, local-office 138 and toll-office 140). WSC 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially-distinct areas called "cells." As depicted in FIG. 1, each cell is schematically represented by a hexagon; in practice, however, each cell usually has an irregular shape that depends on terrain topography. Typically, each cell contains a base station, which comprises radios and antennas that the base station uses to communicate with the wireless terminals in that cell and also comprises the transmission equipment that the base station uses to communicate with WSC 120.

As an example of wireless telecommunications, when wireless terminal 101-1 desires to communicate with wireless terminal 101-2, wireless terminal 101-1 transmits the desired information to base station 103-1, which relays the information to WSC 120. Upon receiving the information, and with the knowledge that it is intended for wireless terminal 101-2, WSC 120 then returns the information to base station 103-1, which relays the information, via radio, to wireless terminal 101-2.

The wireless telecommunications described above occur over a plurality of communication channels. Such channels are characterized by a carrier frequency, and a bandwidth (e.g., 30 kHz) over which the carrier frequency is modulated to carry information content. Wireless service providers license, at a very substantial cost, a band of frequency spectrum sufficient to provide an adequate number of communication channels for supporting communications within a given wireless system.

The amount of spectrum that a provider must obtain to support such communications is predominantly a function of (1) the amount of spectrum that a channel consumes, (2) the extent to which channels used in any one of the cells can be reused in other cells, (3) the call traffic ("call demand" or "traffic demand") on the system, and (4) the acceptable percentage of blocked call attempts. Regarding (2), channel reuse is limited by channel interference. Such interference, which may occur between cells ("co-channel interference") and between numerically-consecutive or nearly-consecutive carrier frequencies ("adjacent-channel interference"), must be kept within acceptable limits.

Since spectrum is very expensive, it is disadvantageous for a provider to license substantially more spectrum than is required for supporting communications within its wireless telecommunications system. As such, it would be advantageous to have a good estimate of that spectrum requirement. Unfortunately, little guidance is available for estimating the spectrum requirements for a wireless telecommunications system. One reason for the dearth of information on the subject may be the difficulty of estimating such requirements, which may be abstracted as a generalization of the notoriously difficult problem of graph "coloring." In fact, frequency spectrum estimation adds an additional degree of complexity to the already complicated standard graph coloring problem.

SUMMARY OF THE INVENTION

In accordance with an illustrative embodiment of the present invention, a method for designing a wireless telecommunications system is provided. In one embodiment of such a method, a cell layout is developed based on field data, call demand per cell is then estimated, and a channel demand based on the call demand is determined on a cell-by-cell basis. The inventors have discovered that using the cell-by-cell channel demand data, a reasonably tight upper bound on the number of communication channels required to satisfy the system-wide call demand can be estimated. In the present context, the phrase "upper bound" means that the required number of communication channels will be no greater than the estimate obtained in accordance with the present teachings.

It is implicit in the procedure for estimating the upper bound that no mutually "interfering" base stations use the same channel (i. e., frequency). In a first embodiment, only those base stations (cells) that are adjacent or "nearest" to one another are considered to be interfering. In a second embodiment, nearest and "next-to-nearest" base stations are considered to be interfering.

In accordance with the present teachings, groups or "cliques" of interfering base stations or cells are defined. A wireless telecommunications system usually comprises many base stations; as such, a plurality of cliques may be defined for any given system. A channel demand is determined for each clique by adding up the channel demand for each cell in the clique. The greatest channel demand of all cliques determines a "maximum clique demand" $\omega^d$. The upper bound on the number of channels required to satisfy the system-wide call demand when interfering cells are adjacent cells is given by the expression: $\chi^d \leq 17/12 \cdot \omega^d$. The upper bound on the number of channels required to satisfy the system-wide call demand when mutually-interfering cells are adjacent cells and next to adjacent cells is given by the expression: $\chi^d \leq 2 \cdot \omega^d - d_{min}$, wherein $d_{min}$ is minimum channel demand, per cell, system wide.

Having a reasonably-good estimate of the upper bound on the system-wide channel requirement, a wireless service provider may then seek to obtain or allot a commensurate amount of frequency spectrum to support its system.

DETAILED DESCRIPTION

In accordance with an illustrative embodiment of the present invention, a method for designing a wireless telecommunications system, including the estimation of an upper bound on frequency spectrum requirements, is provided. The upper bound estimate is based on a channel allocation method described in U.S. Pat. App. Ser. No. 09/048,443, filed on even date herewith entitled "Method for Operating a Wireless Telecommunications System," attorney docket: Khanna 3-6.

Figure 1:
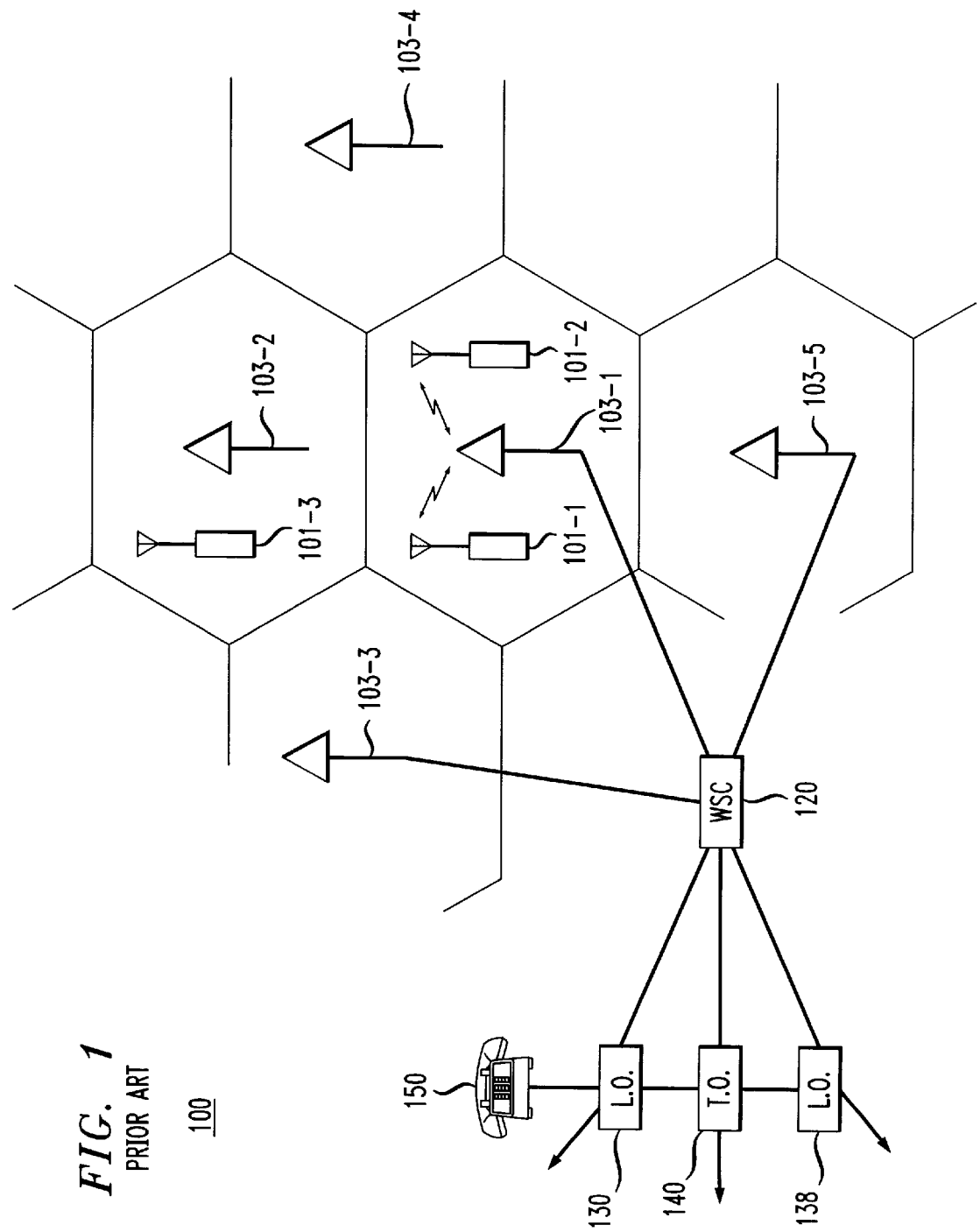
FIG. 1 depicts a schematic of a prior art wireless telecommunications system.

The frequency-spectrum estimate is based on a telecommunications system having a plurality of cells arranged in the usual hexagonal grid topology illustrated in FIG. 1. In accordance with the present teachings, the upper bound estimate of frequency spectrum is a function of call demand in each cell and intercell interference. For the purposes of the present Specification, two cells (more properly, base stations) are considered to be "interfering" if they are close enough to interfere with each other when using the same carrier frequency (i.e., channel) for wireless communications. In estimating spectrum requirements, any allocation of channels among cells in a system must not assign the same frequencies to a pair of interfering base stations. As such, the frequency-spectrum requirement is the minimum number of channels required to support the system-wide call demand such that no interfering base stations share a frequency in common.

Figure 2A:
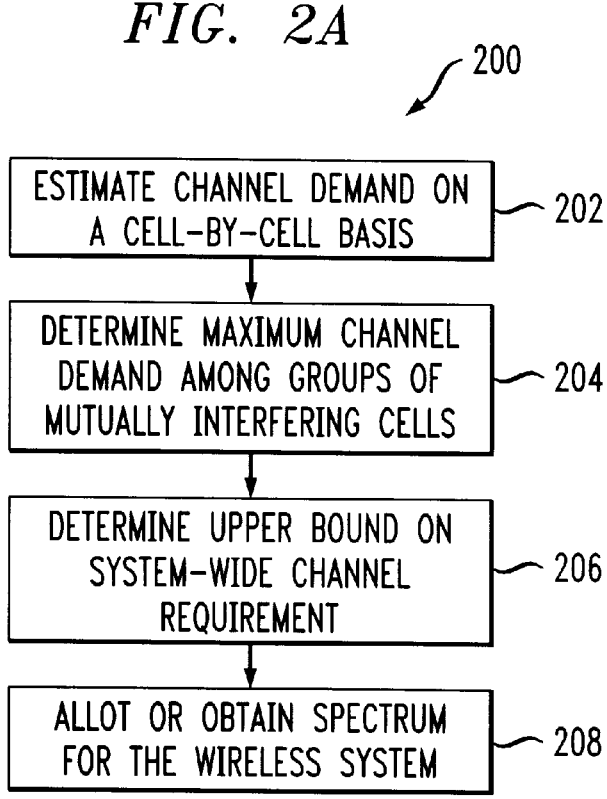
FIG. 2a depicts a flow diagram of a method according to an illustrative embodiment of the present invention for designing a wireless telecommunications system including the estimation of spectrum requirements.
Figure 2B:
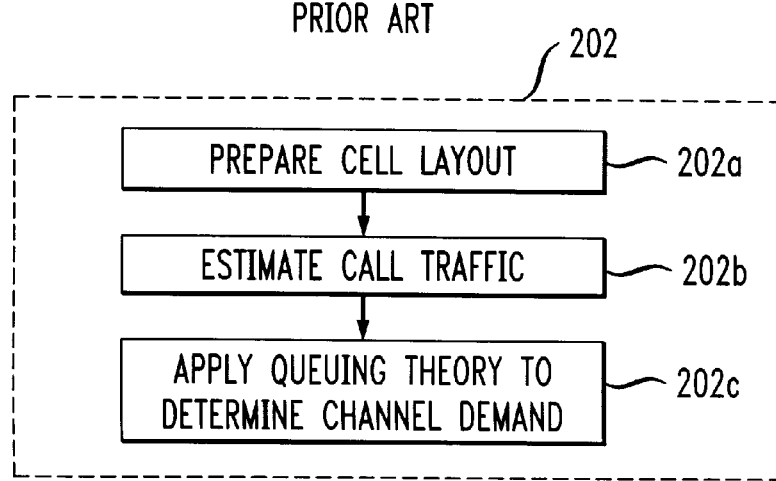
FIG. 2b depicts a flow diagram of a method for estimating channel demand.

A method 200 for designing a wireless telecommunications system including estimating an upper bound on frequency spectrum requirements in accordance with the present teachings is depicted by flow diagram in FIG. 2a. In operation 202, a channel demand $d_i$ is determined by known methods (e.g., queuing theory) for each cell i in the wireless system. FIG. 2b depicts steps in a typical method for estimating cell channel demand. As indicated in operation 202a (FIG. 2b), a cell-layout for the wireless system is developed utilizing known methods. Such methods include collecting field data for generating an RF map of the region. Data for such mapping can be obtained using trial transmitters and receivers. For example, a transmitter is placed in a truck and parked at a first location within the geographic region to be serviced by the planned wireless system. A multiplicity of other trucks each having a receiver and a locating device, such as a GPS unit, are driven in the vicinity of the first location, and record received signal strength and location. The transmitting truck is then moved to a second location, further readings are obtained, and the procedure is again repeated. In this manner, the geographic region comprising the planned wireless telecommunications system is RF-mapped.

A grid of hexagonal-shaped cells is placed over the RF map. Base stations are positioned within each cell to provide, to the extent possible, adequate communications coverage for that cell. Such positioning considers, among other factors, the RF propagation characteristics within the cell as affected by terrain topology, man-made structures and the like.

In operation 202b, call traffic is estimated within each cell by known methods, which may consider historical usage factors, projected sales of wireless terminals, etc. In operation 202c, queuing theory is applied to determine the channel demand $d_i$ for each cell i in the system. For example, based on the estimated traffic demand and an estimated call duration, those skilled in the art can use Erlang tables to determine channel demand.

In operation 204 of method 200, "maximum clique demand" $\omega^d$ is determined. As used herein, the term "clique" refers to a group of mutually-interfering base stations. In embodiments wherein only co-channel interference (not adjacent channel interference) between nearest (i.e., adjacent) cells is considered, clique size is 3. This is apparent from FIG. 3, which depicts a grid of hexagonal cells representative of the cells of a wireless telecommunications system. Base stations (or cells) 303-1, 303-2 and 303-3 form a first clique CL1. Other base stations, such as 303-4, 303-5 and 303-6, do not belong to CL1 because such base stations are not "nearest cells" to at least some of the base stations in first clique CL1. For example, while base station 303-5 is adjacent to base station 303-1 of first clique CL1, it is not adjacent to the other first clique base stations (i.e., base stations 303-2 and 303-3). Base station 303-5 and base station 303-1 do, however, belong to another clique with 303-4; second clique CL2. It is clear that in a typical wireless telecommunications system, there will be many such cliques.

Figure 3:
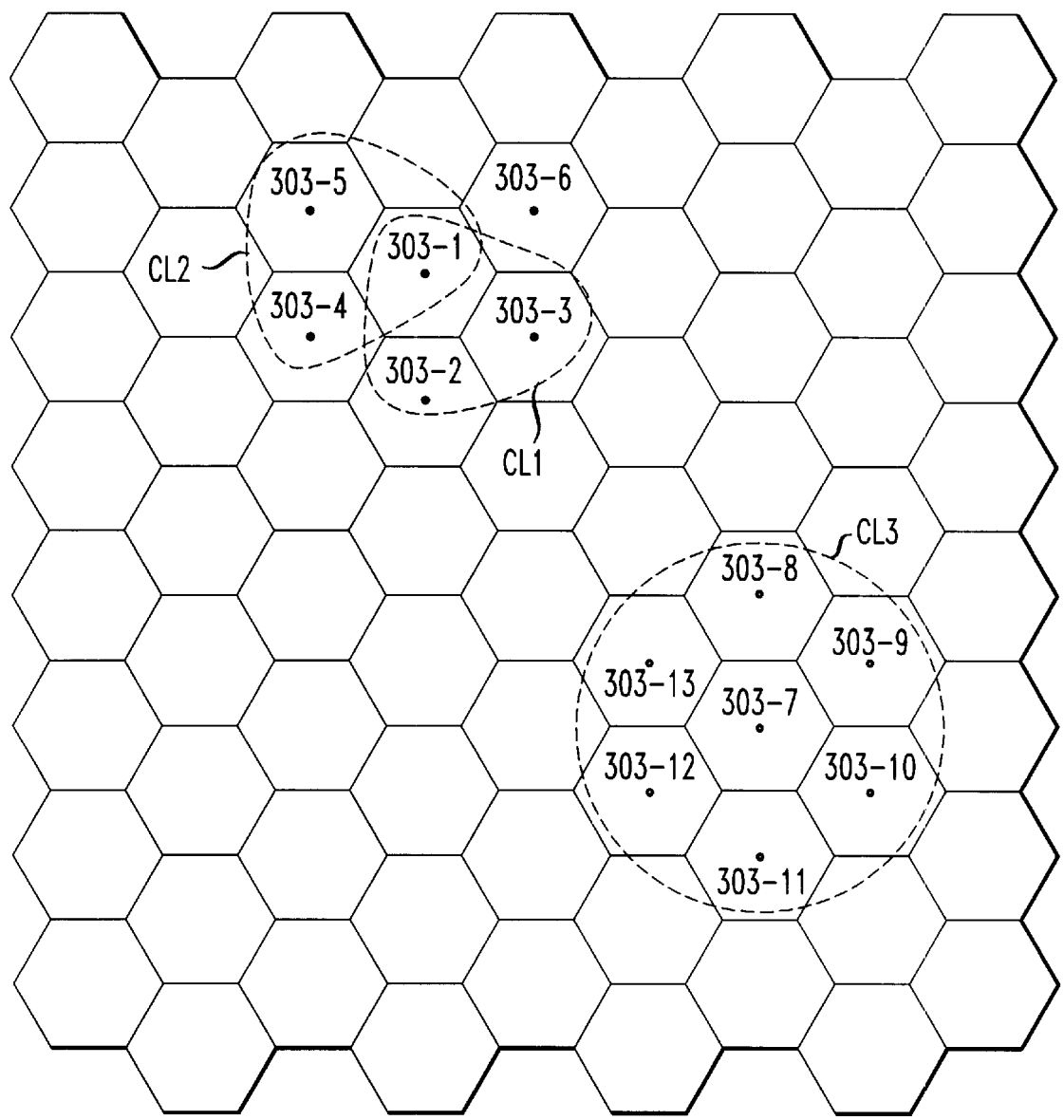
FIG. 3 depicts a portion of the cells in a wireless telecommunications system, some of which cells are organized into cliques.

In embodiments wherein nearest- and next-to-nearest co-channel interference is considered, clique size is 7. Third clique CL3 depicted in FIG. 3 represents such a seven-membered clique, and includes base stations (or cells) 303-7, 303-8, 303-9, 303-10, 303-11, 303-12, and 303-13.

The parameter "$\omega^d$," the "maximum clique demand," is defined as follows. As previously noted, a channel demand $d_i$ is determined for each cell in the wireless system. In first clique CL1, cell 303-1 has channel demand $d_1$, cell 303-2 has channel demand $d_2$, and cell 303-3 has demand $d_3$. In clique CL2, cell 303-5 has channel demand $d_5$, cell 303-4 has channel demand $d_4$, and, as already indicated, cell 303-1 has channel demand $d_1$. For illustrative purposes, it is assumed that $d_1=2$ (i.e., 2 channels are sufficient to satisfy the call demand in cell 303-1), $d_2=3$, $d_3=3$, $d_4=2$, and $d_5=2$. Given the foregoing channel demands, clique CL1 has a total demand of 2+3+3=8, and clique CL2 has a total demand of 2+2+2=6. As between cliques CL1 and CL2, clique CL1 has the maximum clique demand. For the foregoing example, $\omega^d=8$. Maximum clique demand $\omega^d$ is thus the demand of the clique having the greatest channel demand of all cliques in the system.

Having determined the maximum clique demand, an upper bound on the number of channels required to satisfy the system-wide call demand in the wireless telecommunications system is estimated, as indicated in operation 206 of method 200. The present inventors have found that for embodiments wherein only co-channel interference between nearest cells is considered, the upper bound on the number of channels $\chi^d$ required for satisfying the demand is given by:

$$[1] \chi^d \leq 17/12 \omega^d.$$

Moreover, the present inventors have found that for embodiments in which co-channel interference between nearest and next-to-nearest cells is considered, the upper bound on the number of channels required for satisfying call demand is given by:

$$[2] \chi^d \leq 2\omega^d - d_{min},$$

wherein: $d_{min}$ is the minimum channel demand per cell, system-wide.

In a previous example, clique CL1 was determined to have a demand of 8. If clique CL1 is determined to define the maximum clique demand for a system, then, considering only nearest cell co-channel interference:

$$[3] \chi^d \leq 17/12(8) \leq 12.$$

Thus, given a maximum clique demand of 8 and considering only nearest-cell co-channel interference, no more than 12 frequencies are required to satisfy the call demand in the wireless system.

In the earlier example addressing nearest- and next-to-nearest cell interference, illustrative third clique CL3 (FIG. 3) was defined to include cells or base stations 303-7, 303-8, 303-9, 303-10, 303-11, 303-12, and 303-13. For illustrative purposes, it is assumed that the channel demands for those cells are $d_7=2$, $d_8=3$, $d_9=2$, $d_{10}=2$, $d_{11}=2$, $d_{12}=3$, and $d_{13}=2$, respectively. Assuming that clique CL3 defines a maximum clique demand for a system, which in the present example is 2+3+2+2+2+3+2= 16, and, given such channel demands, $d_{min}$ is 2, then:

$$[4] \chi^d \leq 2(16) - 2 \leq 30.$$

Thus, given a maximum clique demand of 16 and considering nearest and next-to-nearest cell co-channel interference, no more than 30 frequencies are required to satisfy the call demand in the wireless system.

Expressions [1]–[4] do not consider the effects of adjacent-channel interference on spectrum requirements. Adjacent-channel interference, which is typically weaker than co-channel interference, arises from the fact that the frequencies in the spectrum have a natural ordering that rules out the use of consecutive or nearby frequencies. The effect of such adjacent-channel interference is now addressed. Only adjacent channel interference occurring within a given cell is considered herein. While adjacent channel interference between adjacent cells may exist, such interference is substantially weaker than the other forms of interference mentioned herein and can reasonably be ignored.

The present inventors have found that for embodiments in which nearest-cell co-channel interference and adjacent-channel interference are considered, the upper bound on the system-wide channel requirement $\psi^d$ is given by:

$$[5] \psi^d \leq 3d_{min} + 2(\omega^d - 2d_{min}),$$

where: $d^{min}$ is minimum channel demand per cell, system-wide.

For example, assuming $d_{min}=2$, and $\omega^d=8$, then:

$$[6] \psi^d \leq 3(2) + 2[8 - 2(2)] \leq 14.$$

Thus, for the illustrative example, the upper bound on the system-wide channel requirement increases from 12 to 14 when adjacent-channel interference is considered. (See expression [3]).

It has been found, surprisingly, that for embodiments in which adjacent-channel interference is considered in conjunction with nearest- and next-to-nearest- cell co-channel interference, the upper bound on frequency spectrum $\psi^d$ is given by:

$$[7] \psi^d \leq 2\omega^d.$$

Details concerning the derivation of expressions are not necessary for understanding or using the present invention, and, as such, are not presented herein. Such details are provided in a paper by the inventors entitled "On Wireless Spectrum Estimation and Generalized Graph Coloring," presented at IEEE INFOCOM '98, Mar. 29–Apr. 2, 1998 in San Francisco, Calif. (17th Annual Joint Conf. Of the IEEE Computer and Communications Society), incorporated herein by reference.

Finally, as indicated in operation 208 of method 200, after having estimated the upper bound of the channel requirement, a wireless spectrum provider obtains a band of spectrum consistent therewith (assuming some channel bandwidth). If the provider already has the spectrum, then it is allotted consistent with the determined upper bound.

It is to be understood that the embodiments described herein are merely illustrative of the present invention. Other embodiments can be devised in application of the present teachings by those of ordinary skill in the art without departing from the scope and spirit of the invention. It is therefore intended that such other embodiments be included within the scope of the following claims and their equivalents.

We claim:

1. A method for designing a wireless telecommunications system having a plurality of cells, comprising the steps of:

estimating a channel demand for each cell based on call demands within each cell;

determining a maximum channel demand $\omega^d$ among all groups of mutually-interfering cells based on the estimated channel demand for each cell, wherein the interference between mutually-interfering cells is co-channel interference;

calculating a number of communication channels $\chi^d$ required to satisfy call demands in all cells of the system according to the expression: $\chi^d \leq 17/12 \cdot \omega^d$ when mutually-interfering cells are adjacent cells, and according to the expression $\chi^d \leq 2 \cdot \omega^d - d_{min}$ when mutually interfering cells are adjacent cells and next-to-adjacent cells, wherein $d_{min}$ is a minimum channel demand of all cells in the system;

allotting a band of frequency spectrum for use in the system sufficient to provide the calculated number of communication channels based on a desired channel bandwidth.

2. The method of claim 1, wherein the step of estimating channel demand further comprises the step of estimating call demand in each cell.

3. The method of claim 2, wherein the step of estimating channel demand further comprises the step of developing a cell-layout based on field data.

4. The method of claim 3, further comprising obtaining the field data using mobile transmitters, receivers and locating devices.

5. The method of claim 2, wherein the step of estimating channel demand further comprises the step of using Erlang tables to express call demand as channel demand.

6. The method of claim 1, wherein the desired channel bandwidth is in the range of about 20 to 50 kHz.

7. A wireless telecommunications system comprising:

a first plurality of cells; and a base station situated within each cell, each base station operable to communicate with wireless terminals within the same cell and other base stations in other cells;

wherein, the wireless communications system uses a band of frequency spectrum over which intracell communication occurs, which band is segregated into a number of channels sufficient to satisfy system-wide call demand, wherein the number of channels, and hence the band of frequency spectrum, is estimated by:

estimating a channel demand for each cell based on call demand within each cell;

determining a maximum channel demand $\omega^d$ among all groups of mutually-interfering cells based on the estimated channel demand for each cell, wherein the interference between mutually-interfering cells is co-channel interference; and calculating a number of communication channels $\chi^d$ required to satisfy call demands in all cells of the system according to the expression: $\chi^d \leq 17/12 \cdot \omega^d$ when mutually-interfering cells are adjacent cells, and according to the expression: $\chi^d \leq 2 \cdot \omega^d - d_{min}$ when mutually interfering cells are adjacent cells and next-to-adjacent cells, wherein $d_{min}$ is a minimum channel demand of all cells in the system.

\* \* \* \* \*